Aug. 27, 1963    J. B. COOPER    3,101,634
SONIC WELDER
Filed Sept. 12, 1960    2 Sheets-Sheet 1
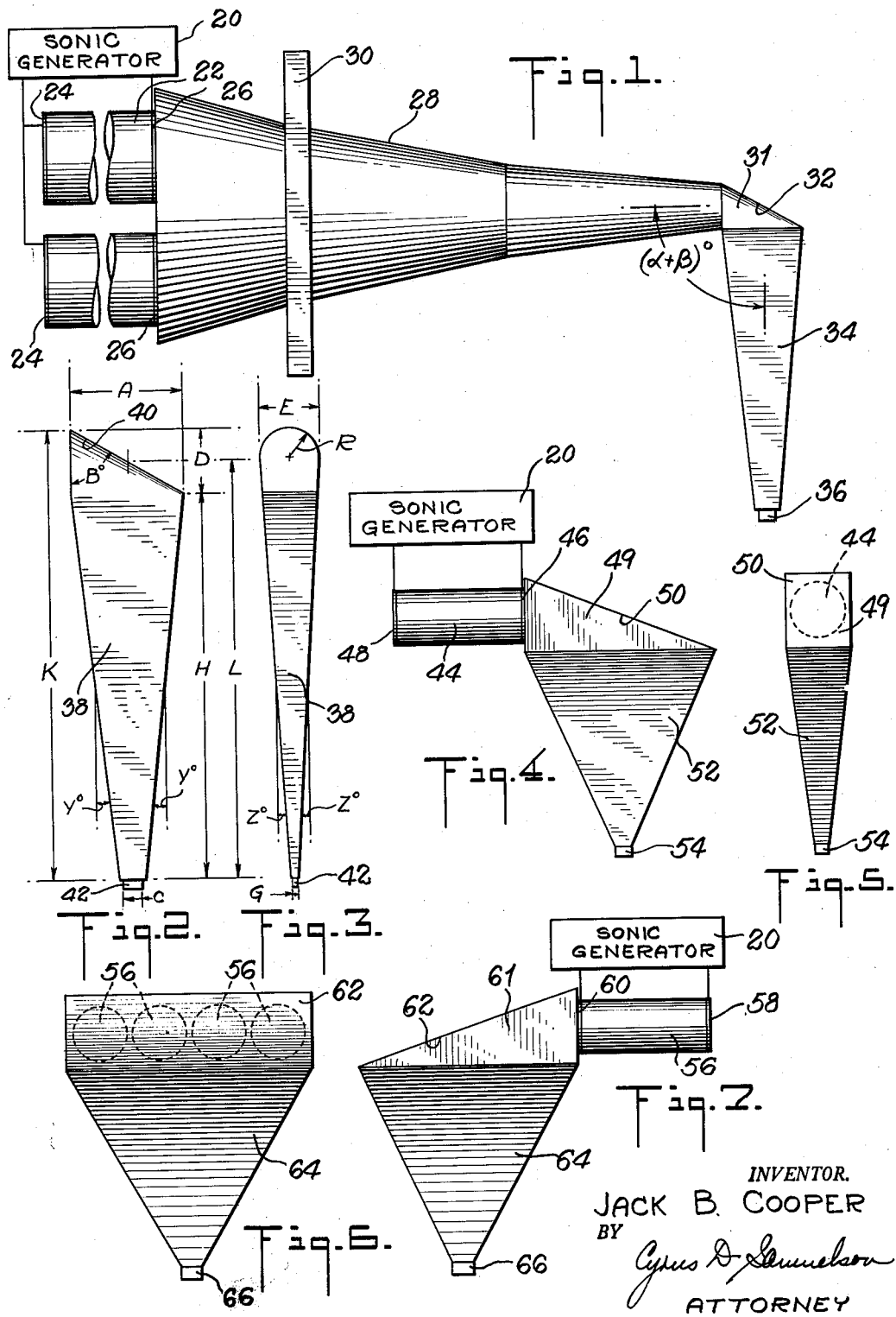
INVENTOR.
JACK B. COOPER
BY
ATTORNEY Aug. 27, 1963      J. B. COOPER      3,101,634
SONIC WELDER
Filed Sept. 12, 1960      2 Sheets-Sheet 2
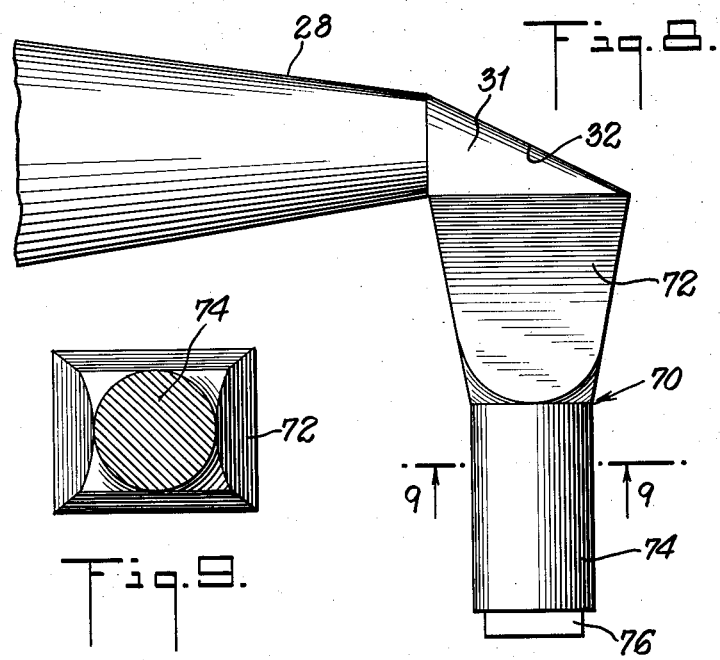
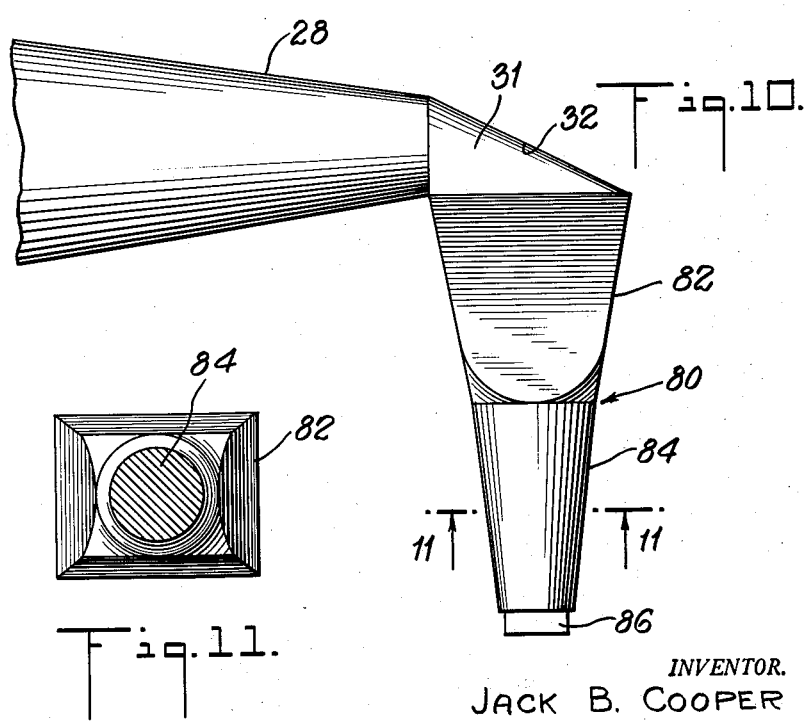
INVENTOR.
JACK B. COOPER
BY
Cyrus D. Samuelson
ATTORNEY

United States Patent Office 3,101,634
Patented Aug. 27, 1963

3,101,634
SONIC WELDER
Jack B. Cooper, Somerville, N.J., assignor to Gulton Industries, Inc., Metuchen, N.J., a corporation of New Jersey
Filed Sept. 12, 1960, Ser. No. 55,597
19 Claims. (Cl. 78—82)

My invention relates to sonic welders and in particular to those welders which utilize mechanical transformers in connection therewith.

It has been found that sonic welding is best accomplished when the interface and the welding tool are vibrated in transverse mode. In most sonic welders, the transducer and the mechanical transformer are vibrated in compressional mode and the tool tip is vibrated in transverse mode. This type of conversion from the compressional mode to the transverse mode is not economical and results in considerable inefficiency in the energy conversion.

I have discovered that much better results are obtained when I vibrate the transducer in compressional mode and transform this vibration into transverse mode vibration (preferably shear or torsion) of a portion of the mechanical transformer. To accomplish this end it is necessary to provide a proper termination at the end of the mechanical transformer attached to the transducer which will result in the compressional waves being converted into transverse waves and propagated down through the tool. I have found that I am able to produce transverse vibrations at the work interface much more efficiently than by the prior art means. High amplitude compressional vibrations are avoided thereby eliminating mechanical fatigue of the tool, mechanical transformer end and the braze joint between the mechanical transformer and the tool.

Accordingly, it is an important object of my invention to provide a mechanical transformer for a sonic welding device in which there is a maximum energy transfer when converting the compressional vibrational wave into a transverse vibrational wave.

It is a further object of my invention to provide such a mechanical transformer wherein the driving transducers vibrate in compressional vibrational mode.

These and other objects, features, advantages and uses will be apparent during the course of the following description when taken in conjunction with the accompanying figures wherein:

FIGURE 1 is a side elevational view of a preferred embodiment of mechanical transformer of my invention, driven by a plurality of transducers vibrating in compressional mode and wherein the conversion from compressional to shear mode is made in the mechanical transformer, FIGURE 2 is a side elevational view of a combined reflecting element and shear wave mechanical transformer of my invention wherein the combination is formed of a single piece of material, FIGURE 3 is a front elevational view of the combined reflecting element and shear wave mechanical transformer of FIGURE 2, FIGURE 4 is a side elevational view of a further embodiment of sonic welder of my invention, FIGURE 5 is a front elevational view of the embodiment of FIGURE 4, FIGURE 6 is a front elevational view of a still further embodiment of sonic welder of my invention, FIGURE 7 is a side elevational view of the embodiment of FIGURE 6, FIGURE 8 is a side elevational view, somewhat enlarged, of a portion of a mechanical transformer of my invention wherein compressional mode vibrations are transformed into shear mode vibrations and then into torsional mode vibrations, FIGURE 9 is a cross-sectional view along the lines 9—9 of FIGURE 8, FIGURE 10 is a view similar to that of FIGURE 8 of a further mechanical transformer of my invention wherein compressional mode vibrations are transformed into shear mode vibrations and then into torsional mode vibrations, and FIGURE 11 is a cross-sectional view along the lines 11—11 of FIGURE 10.

In the drawings, wherein for the purpose of illustration, are shown various embodiments of sonic welders of my invention, the numeral 20 designates a sonic generator which has been shown diagrammatically. Sonic generator 20 may be of any of the types of electronic sonic generators which are well known in the art. Sonic transducers 22, 44 and 56 are shown to be solid cylinders formed of ferroelectric ceramic such as barium titanate or lead titanate-zirconate but any transducer, which may be vibrated in compressional mode (parallel to the longitudinal axis of the cylinder), may be employed to carry out the teachings of my invention. While I have chosen to illustrate my invention with cylindrical transducers, other shapes, configurations and types may be used so long as the portion of the mechanical transformer in contact with the transducer is driven in compressional mode. Electrodes 24 and 26 are applied to transducers 22 in the manner which is well known in the art, electrodes 46 and 48 are similarly applied to transducer 44 and electrodes 58 and 60 are similarly applied to transducers 56. Transducers 22 are attached to tapered mechanical transformer 38 by means of rigid epoxy resin or are clamped to mechanical transformer 28 as is shown and described in U.S. application for Letters Patent Serial No. 731,744 of Richard D. McGunigle which is assigned to the assignee hereof.

Flange 30 is provided to permit the user of welders of my invention to mount it on a trolley or other suitable device (not shown). Reflecting element 31 is affixed to the smaller end of mechanical transformer 28 as shown in FIGURE 1 and reflecting surface 32 makes an angle of less than 90° with the longitudinal axis of mechanical transformer 28 considering the portion of the surface to the left of the point of intersection of the longitudinal axis with the surface. Tapered mechanical transformer 34 is affixed to reflecting element 31 such that its longitudinal axis makes an angle of the order of 45° to 120° with the longitudinal axis of mechanical transformer 28. The angle $\alpha + \beta$ between the longitudinal axes of mechanical transformers 28 and 34 theoretically may be any value from 0° to 135°. However, when the mechanical transformers are formed of materials which are practicable for such use, the angle $\alpha + \beta$ is within the range 45° to 120°. $\alpha$ is the angle of reflection of the transverse wave and $\beta$ is the angle of incidence of the longitudinal wave. Tool tip 36, which is positioned on the longitudinal axis of the transformer 34 as shown in FIG. 1, is affixed to the smaller end of mechanical transformer 34 but welders of my invention may be used without a tool tip. When a tool tip such as tool tip 36 is used, it is brazed or otherwise attached to mechanical transformer 34.

It has been shown that when a longitudinal wave is incident upon a plane, reflecting surface, the reflection usually consists not only of a longitudinal wave parallel to the direction of propagation thereof but also of a reflected transverse wave at right angles thereto. If the transverse wave rotates about the axis of propagation, then the wave is referred to as a torsional wave; if it does not rotate, it is referred to as a shear wave. See, for example, page 23 of Physical Acoustics and the Properties of Solids, by Warren P. Mason, published by D. Van Nostrand Company, Inc., 1958. The particular type of transverse wave obtained depends upon the physical properties and boundaries of the medium. This is due to the fact that these factors determine the boundary conditions involved in the differential equations of the particle motion of the medium. When the transverse wave enters a pyramid, the geometry demands shear mode and when the transverse wave enters a cylinder or a cone, the geometry demands torsional mode.

Under certain conditions, no longitudinal wave is reflected by the reflecting surface. This occurs, for example, when using rolled zinc (Poisson's ratio=.25) and when angle $\alpha+\beta=90°$ with angle $\alpha=30°$ and angle $\beta=60°$. For other materials, there is a preferred value of angle $\alpha+\beta$ which results in no longitudinal wave being reflected from the reflecting surface. This angle depends upon the value of Poisson's ratio for the material of which the reflecting element is made.

Good transformation results are obtained when the angle between the longitudinal axis of mechanical transformer 28 and reflecting surface 32 is of the order of 5° to 35°.

In operation, sonic transducers 22 (FIGURE 1) are caused to vibrate in compressional mode by sonic generator 20. The vibration of sonic transducers 22 causes mechanical transformer 28, whose length is an integral multiple of a half wave length of the compressional wave being transmitted therein, to vibrate in compressional mode. The compressional waves impinge on reflection, are mostly converted into shear waves. These shear mode sonic waves are transmitted in mechanical transformer 34 so that its smaller end and the tool tip affixed thereto, if any, vibrate in shear mode. The length of mechanical transformer 34 is an integral multiple of a half wave length of the sonic shear wave transmitted therein.

I have found it necessary to vibrate the smaller end of mechanical transformer 34 and tool tip 36 in shear mode because good welds are only obtained if the materials being welded are vibrated in transverse mode. If the tool tip is vibrated in compressional mode there is too much loss in converting its energy into transverse mode vibration of the material being welded. If desired, the welder of FIGURE 1 may be driven by a single sonic transducer in place of the plurality of transducers shown in the figure.

In FIGURES 4 and 5, there is shown a sonic welder of my invention whrein I have eliminated the compressional mode, mechanical transformer. In this embodiment, sonic transducer 44 is affixed to reflecting element 49 and is driven by sonic generator 20 such that it vibrates in compressional mode. Mechanical transformer 52 is affixed to reflecting element 49 by welding or other means or the two elements may be formed of a single piece of material. Reflecting surface 50 makes an angle less than 90° with the longitudinal axis of sonic transducer 44 and the longitudinal axis of mechanical transformer 52 makes an angle of the order of 45° to 120° with the longitudinal axis of sonic transducer 44. This embodiment may be used with or without tool tip 54 which, if used, is brazed or otherwise affixed to mechanical transformer 52.

The embodiment of FIGURES 6 and 7 is similar to that of FIGURES 4 and 5 except for the fact that a plurality of sonic transducers 56 are affixed to reflecting element 61. The plurality of sonic transducers 56 are vibrated in compressional mode by sonic generator 20 and the compressional wave is reflected by reflecting surface 62 such that a shear wave is propagated in mechanical transformer 64. Tool tip 66 is affixed to the smaller end of mechanical transformer 64 as described heretofore.

Since the mechanical transformer to which the tool tip is affixed is vibrated in transverse mode instead of in compressional mode, there is much less stress placed upon the joint between the tool and the mechanical transformer and upon the joints between the reflecting element and the mechanical transformers. This results in much greater efficiency of operation than is possible with welders which are operated in compresisonal mode.

FIGURES 2 and 3 serve to illustrate the theory underlying sonic welders of my invention as well as to depict a further embodiment of the shear wave mechanical transformer used with welders of my invention. By way of example and not by way of limitation of the scope of my invention, following is the design data for shear wave mechanical transformer 38 and reflecting element 40 which are formed from a single piece of rolled zinc.

Mechanical transformer 38 may be affixed to mechanical transformer 28 so as to replace reflecting element 31 and mechanical transformer 34. In this embodiment, in effect, the shear wave mechanical transformer and the reflecting element are formed of a single piece of material. Among other things, this construction eliminates any strain at the joint between the reflecting element and the shear wave mechanical transformer. The reflecting surface is designated as 40 and the tool tip affixed to mechanical transformer 38 is designated 42. For use with mechanical transformer 28, it is desired to have the center of reflecting surface 40 more than 2½ inches above the work. The shear wave velocity in rolled zinc is given in the American Institute of Physics Handbook, published by McGraw-Hill in 1957 at page 3–80 as $2.44 \times 10^3$ meters per second which is equal to $96 \times 10^3$ inches per second. At 20 kilocycles (which frequency will produce satisfactory welds), one wave length is $96 \times 10^3$ divided by $20 \times 10^3$ or 4.8 inches. Since a half wave length is less than 2½ inches, the mechanical transformer will be made one wave length long. This is necessary because the mechanical transformer to be efficient must be an integral multiple of a half wave length of the wave being propagated therein. The tip configuration is determined by the desired weld configuration or the configuration of the work and usually both. For general seam welding, a tip aspect ratio of 3 and a width of ⅛" has been used successfully. Thus, referring to FIGURES 2 and 3, $G=⅛"$, and $C=⅜"$.

The remaining tool dimensions can now be determined. The length L was found to be 4.8". The angle of the reflecting plane should be 30° (for zinc: Poisson's ratio=0.25). Therefore, angle B will be 60°. Radius R will be .35" (the radius of the small end of the mechanical transformer). This requires dimensions D and E to be .70 inch.

Dimension $H=L-R=4.45"$.

The overall length $K=H+D=5.15"$.

Dimension A is found from trigonometry to be:

$$A=D \tan B$$

For this tool, $A=.7\sqrt{3}=1.21$ inches.

The taper angle Y is found from:

$$Y=\tan^{-1}\left(\frac{A-C}{2H}\right)=5.4°$$

The taper angle Z is given by:

$$Z=\tan^{-1}\left(\frac{E-G}{2L}\right)=3.44°$$

In the design example set forth just above, the sonic frequency is of the order of 20 kc. However, I have found that sonic welding can be satisfactorily carried out throughout the sonic frequency range and particularly from 10 to 50 kc. At the lower frequencies, one is able to use higher power inputs whereas at the higher frequencies, since the dimensions are smaller, small, delicate work may be carried out more readily.

FIGURES 8 and 9 illustrate the smaller end of mechanical transformer 28, reflecting element 31 with reflecting surface 32, mechanical transformer 70, and tool tip 76. Mechanical transformer 70 comprises pyramidal section 72 and cylindrical section 74. The transition from pyramidal section 72 to cylindrical section 74 takes place at any odd quarter wave length from the junction of reflecting element 31 and mechanical transformer 70. Reflection of the compressional wave by reflecting surface 32 causes a shear wave to be propagated in pyramidal section 74. This shear wave is translated into a torsional wave in cylindrical section 74. The shear wave becomes a torsional wave because of the geometry of cylindrical section 74. Tool tip 76 which is preferably disk or annular shaped also vibrates in torsional mode and causes the work to vibrate in a transverse mode. The character of the work and its dimensions determines the type of transverse mode of vibration which will be propagated in the work material. Except for the special cases of extremely thin work material, circular work material or work with small lengths and widths, the mode of vibration of the work is the shear mode.

It is also within the contemplation of my invention to make mechanical transformer 70 cylindrical in shape throughout its length. In such a case the wave propagated in it as a result of the reflection of the compressional wave from reflecting surface 32 will be in the torsional mode.

FIGURES 10 and 11 illustrate a mechanical transformer system similar to that of FIGURES 8 and 9. Mechanical transformer 80 comprises pyramidal section 82 and conical section 84. The junction of sections 82 and 84 occurs at any odd quarter wave length from the junction of mechanical transformer 80 and reflecting element 31. The function and operation of mechanical transformer 80 are the same as those of mechanical transformer 70. Tool tip 86 is of shape similar to that of tool tip 76.

It is also within the contemplation of my invention to make mechanical transformer 80 conical in shape throughout its length. In such a case, the wave propagated in it as a result of the reflection of the compressional wave from reflecting surface 32 will be in the torsional mode.

The transverse wave mechanical tranformers of FIGURES 8 through 11 may also be used with the embodiments of FIGURES 4 through 7.

In all of the embodiments of my invention, the tool tips may be dispensed with and welding may also be accomplished by placing the end of the mechanical transformer directly in contact with the work.

A motional magnification in the transverse wave mechanical transformer, which is equal to the square root of the ratio of the area at its larger end to the area at its smaller end, is obtained. In addition to this motional magnification, I also obtain other magnification if the materials of the mechanical transformers are properly chosen. For example, if mechanical transformer 28 is formed of steel and mechanical transformer 34 is formed of zinc, additional magnification is obtained. This is due to the fact that the characteristic impedance of zinc is lower than that of stainless steel and the amplitude increases when the wave goes from steel to zinc. Because of the lower velocity of propagation in zinc, the energy transmitted across the boundary from steel to zinc is less than the incident energy. So, a magnification of amplitude is obtained at the expense of energy transfer. For the system discussed in connection with FIGURES 3 and 4 and using mechanical transformer 38 of FIGURE 1, I have obtained an overall magnification of 28.7 and neglecting propagation losses, a maximum of 82% of the longitudinal energy delivered by the transducers is available as shear energy at the tool tip.

I choose to designate the reflecting element and the transverse wave transmission medium together as a sonic wave transmission system. For example, the following are such sonic wave transmission systems: reflecting element 31 and mechanical transformer 34; reflecting element 49 and mechanical transformer 52; reflecting element 61 and mechanical transformer 64; reflecting element 31 and mechanical transformer 70; and reflecting element 31 and mechanical transformer 80. The sonic transducers are mechanically connected to the sonic wave transmission system either through mechanical transformer 28 or by being affixed directly to the reflecting element.

In the claims to follow, the term "inclined" used to describe the angular relationship between two elements thereof means an angular relationship other than 0° and 90°.

While I have disclosed my invention in relation to specific examples and in specific embodiments, I do not wish to be limited thereto, for obvious modifications will occur to those skilled in the art without departing from the spirit and scope of my invention.

Having thus described my invention, I claim:

1. A sonic welder comprising a sonic generator; at least one sonic transducer; a first tapered mechanical transformer; said sonic transducer being affixed to said first tapered mechanical transformer at the larger end thereof; said sonic generator being connected to said sonic transducer such that said sonic transducer is vibrated at a sonic rate in compressional mode and propagates a sonic wave; the length of said first tapered mechanical transformer being equal to an integral multiple of a half wave length of said sonic wave; said first tapered mechanical transformer being vibrated in compressional mode at said sonic rate; a reflecting element having a reflecting surface affixed to said first tapered mechanical transformer at the smaller end of said first tapered mechanical transformer; said reflecting surface intersected by and inclined with respect to the longitudinal axis of said first tapered mechanical transformer; a second tapered mechanical transformer affixed at the larger end thereof to said reflecting element to receive the reflected waves therefrom and having a straight longitudinal axis extending between the opposite ends thereof and making an angle of the order of 45° to 120° with the longitudinal axis of said first tapered mechanical transformer where the reflected transverse wave is propagated along the longitudinal axis of said second tapered mechanical transformer; said second tapered mechanical transformer being such that the sonic wave reflected from said reflecting surface is propagated therein is in transverse mode along said longitudinal axis thereof; the length of said second tapered mechanical transformer being an integral multiple of a half wave length of said transverse sonic wave propagated therein.

2. A sonic welder as described in claim 1 including a tool tip affixed to the smaller end of said second tapered mechanical transformer.

3. A sonic welder as described in claim 1 wherein said reflecting surface and said second tapered mechanical transformer are formed of a single piece of material.

4. A sonic welder as described in claim 1 wherein said reflecting surface makes an angle of the order of 5° to 35° with the longitudinal axis of said first tapered mechanical transformer considering the portion of the surface furthest from said second mechanical transformer.

5. A sonic welder as described in claim 1 including a plurality of sonic transducers affixed to the larger end of said first tapered mechanical transformer, said sonic generator being connected to said plurality of sonic transducers such that said plurality of sonic transducers are vibrated at a sonic rate in compressional mode.

6. A sonic welder comprising a sonic generator, at least one sonic transducer, a tapered mechanical transformer, a reflecting element having a reflecting surface and affixed to the larger end of said tapered mechanical transformer such that said reflecting surface is intersected by and is inclined with respect to the longitudinal axis of said tapered mechanical transformer to direct reflected transverse waves along said longitudinal axis toward the end of the transformer, said reflecting element and said tapered mechanical transformer together forming a sonic wave transmission system, said sonic transducer being mechanically connected to said sonic wave transmission system and being electrically connected to said sonic generator such that said sonic transducer is vibrated in compressional mode and transmits sonic vibrations in compressional mode to said reflecting surface where the transverse waves are directed along said longitudinal axis the length of said tapered mechanical transformer being a resonant length relative to said transverse sonic wave propagated therein.

7. A sonic welder as described in claim 6 wherein said tapered mechanical transformer comprises a tapered pyramidal section adjacent said reflecting element and a round sided section affixed to the smaller end of said tapered pyramidal section, the length of said tapered pyramidal section being an odd multiple of a quarter wave length of said transverse sonic wave propagated therein.

8. A sonic welder as described in claim 6 wherein said tapered mechanical transformer comprises a tapered pyramidal section adjacent said reflecting element and a tapered conical section affixed at its larger end to the smaller end of said tapered pyramidal section, the length of said tapered pyramidal section being an odd multiple of a quarter wave length of said sonic wave propagated therein.

9. A sonic welder comprising a sonic generator, at least one sonic transducer, a mechanical transformer having cylindrical portion, a reflecting element having a reflecting surface affixed to one end of said transformer such that said reflecting surface is inclined with respect to and is intersected by the longitudinal axis of said transformer to direct reflected transverse waves along said longitudinal axis toward the end of the transformer, said reflecting element and said transformer together forming a sonic wave transmission system, said sonic transducer being mechanically connected to said sonic wave transmission system and being electrically connected to said sonic generator such that said sonic transducer is vibrated in compressional mode and transmits sonic vibrations in compressional mode to said reflecting surface where the transverse waves are directed along said longitudinal axis.

10. In a mechanical vibrating type welder having a vibrating driving member producing compressional vibrations longitudinally therein, the improvement comprising a reflecting element coupled to said driving member to receive the compressional vibrations therefrom and having a reflecting surface for said waves inclined with respect to the longitudinal axis of said driving member and an elongated element extending at an angle to said longitudinal axis and said reflecting surface and connected to said reflecting element receive reflected waves from said reflecting surface in a transverse mode, said elongated element having an end portion which engages the work to be welded and said elongated element having a straight longitudinal axis extending to said end portion thereof and along which axis the transverse waves produced at said reflecting surface are propagated and reach said end portion to vibrate the same in a transverse mode.

11. The welder of claim 10 wherein said elongated element is tapered toward the work engaging end portion thereof.

12. The welder of claim 10 wherein said elongated element is a truncated pyramid tapering toward the work engaging end portion thereof to provide shear mode vibrations therein.

13. The welder of claim 10 wherein said elongated element has at the work engaging end portion thereof a rounded section in which torsional waves are developed.

14. The welder of claim 13 wherein said rounded section is a conical section tapering toward the work engaging end thereof.

15. The welder of claim 10 wherein said elongated element has an inner section adjacent said reflecting element which has a rectangular cross section and an outer section with rounded sides in which torsional vibrations are developed.

16. The welder of claim 15 wherein said point of juncture between said inner and outer sections is located at a nodal point.

17. The welder of claim 10 wherein said reflecting element and elongated element are formed of a single piece of material.

18. The welder of claim 10 wherein the longitudinal axis of said elongated element and the longitudinal axis of said driving member make an angle in the range of from about 45° to 120°.

19. The welder of claim 10 wherein the angle between the longitudinal axes of said driving member and said elongated element and the Poisson's ratio of the elongated element provide substantially no reflected waves vibrating in a compressional mode.

References Cited in the file of this patent

UNITED STATES PATENTS

| | | |
|---|---|---|
| 2,946,119 | Jones | July 26, 1960 |
| 2,947,886 | McGunigle | Aug. 2, 1960 |
| 2,990,616 | Balamuth | July 4, 1961 |

FOREIGN PATENTS

| | | |
|---|---|---|
| 1,087,439 | France | Aug. 25, 1954 |
| 1,087,440 | France | Aug. 25, 1954 |